US007953426B2

(12) United States Patent
Kim

(10) Patent No.: US 7,953,426 B2
(45) Date of Patent: May 31, 2011

(54) MOBILE TERMINAL FOR SENDING AND RECEIVING CONTENTS USING MESSAGING SERVICE AND METHOD THEREOF

(75) Inventor: Dong-Wook Kim, Incheon (KR)

(73) Assignee: LG Electronics Inc., Seoul (KR)

( * ) Notice: Subject to any disclaimer, the term of this patent is extended or adjusted under 35 U.S.C. 154(b) by 457 days.

(21) Appl. No.: 11/520,767

(22) Filed: Sep. 14, 2006

(65) Prior Publication Data

US 2007/0060193 A1    Mar. 15, 2007

(30) Foreign Application Priority Data

Sep. 14, 2005  (KR) .................. 10-2005-0085941

(51) Int. Cl.
*H04W 4/00*    (2009.01)
(52) U.S. Cl. .... 455/466; 455/3.03; 455/403; 455/422.1; 455/418; 455/419
(58) Field of Classification Search .................. 370/473, 370/476, 466; 455/466, 403, 422.1, 3.03, 455/418–420; 715/256, 246, 753
See application file for complete search history.

(56) References Cited

U.S. PATENT DOCUMENTS

| 2001/0021649 | A1* | 9/2001 | Kinnunen et al. ............. 455/412 |
| 2003/0060240 | A1  | 3/2003 | Graham et al. |
| 2003/0096598 | A1* | 5/2003 | Prenzel et al. ................. 455/412 |
| 2003/0110450 | A1* | 6/2003 | Sakai ............................. 715/529 |
| 2003/0149628 | A1* | 8/2003 | Abbosh et al. ................... 705/16 |
| 2004/0097248 | A1* | 5/2004 | Schmidt et al. ............... 455/466 |
| 2005/0097463 | A1* | 5/2005 | Yu ................................. 715/531 |
| 2005/0136953 | A1* | 6/2005 | Jo et al. ......................... 455/466 |
| 2005/0143108 | A1  | 6/2005 | Seo et al. |
| 2005/0156947 | A1* | 7/2005 | Sakai et al. ................... 345/629 |
| 2005/0215271 | A1* | 9/2005 | Sim et al. ...................... 455/466 |
| 2006/0068814 | A1* | 3/2006 | Cheng et al. .................. 455/466 |
| 2006/0212818 | A1* | 9/2006 | Lee ............................... 715/753 |

FOREIGN PATENT DOCUMENTS

| CN | 1638514 A | 7/2005 |
| EP | 1 549 031 A1 | 6/2005 |
| GB | 2 348 082 A | 9/2000 |
| WO | WO-99/37105 A2 | 7/1999 |
| WO | WO 03/028386 A2 | 4/2003 |
| WO | WO-2005/006733 A1 | 1/2005 |

* cited by examiner

*Primary Examiner* — Nick Corsaro
*Assistant Examiner* — Chuong A Ngo
(74) *Attorney, Agent, or Firm* — Birch, Stewart, Kolasch & Birch, LLP

(57) ABSTRACT

A mobile terminal and method for sending and/or receiving contents, are provided. According to an embodiment, the mobile terminal for sending/receiving contents includes: a transceiver for sending/receiving one or more contents; a display unit for displaying the one or more received contents; and, a controller for controlling the transceiver and the display unit, so that the received contents are reproduced in an overlapping manner over a text message to be sent/received together with the contents.

16 Claims, 10 Drawing Sheets

MOBILE TERMINAL FOR SENDING AND RECEIVING CONTENTS USING MESSAGING SERVICE AND METHOD THEREOF

This nonprovisional application claims priority under 35 U.S.C. §119(a) on Patent Application No. 10-2005-0085941 filed in Republic of Korea on Sep. 14, 2005, the entire contents of which are hereby incorporated by reference.

BACKGROUND OF THE INVENTION

1. Field of the Invention

The present invention relates to a mobile terminal, and particularly, to a method and mobile terminal for sending and receiving contents.

2. Description of the Related Art

Many service providers have provided users with various mobile communication services since the introduction of second generation communication technologies. The various communication services include an SMS (Short Message Service), and sending audio data, videos (moving images), electronic mail, and the like. The SMS is for transmitting a short text message via a mobile communication network. A technique for transmitting various contents by using the SMS has been known. Prior to describing such services, a configuration of the SMS will now be described with reference to accompanying drawings.

FIG. 1 is a configuration view that illustrates the configuration of the related art SMS system.

As illustrated, in general, the SMS system includes a mobile terminal (MS: mobile station) 101, a base station (BTS: Base Station Transceiver System) 102, an MSC/SGSN (Mobile Switching Center/Servicing GPRS Support Node) 103, an SMS-GMSC (SMS-Gateway Mobile Switching Center) 104, an HLR (Home Location Register) 105, and an SC (Service Center) 106. Accordingly, when the mobile terminal 101 sends a message, the message is transmitted to the service center 106 via the aforementioned parts and then is received by a mobile terminal at a receiving/reception side.

FIG. 2 is a schematic view that illustrates an SMS protocol stack according to the related art.

As illustrated, the protocol stack includes an application layer (AL), a transport layer (TL), a relay layer (RL), and a link layer (LL). Of these layers, the transport layer basically serves to configure a message upon receiving data from the application layer. Hereinafter, the following description will be made on the assumption that a message is transmitted from the mobile terminal (MS) to the service center (SC). When the mobile terminal sends a message, the message is transmitted to the service center (SC) via the aforementioned layers in the sequential order. Then, the service center (SC) transmits the received message to another mobile terminal, which is the destination. Here, the message passes through those layers in the reverse order. Description will now be made regarding the services that can be provided through such configuration.

It is known that text, data, bell sounds, voices, images, and the like can be transmitted by a method of transmitting various contents using the SMS service. However, in the related art, when transmitting through SMS, the contents should be transmitted such that an image is simply added to a text message or a text message is simply added to an image. Thus, because the type of images that can be transmitted is very limited, only simple images are commonly transmitted, and the contents of the message are also very limited. To solve such problems, an EMS (Enhanced Message Service) and an MMS (Multimedia Message Service) have been developed. Particularly, the EMS allows transmission of a plurality of SMS messages that are connected based on the existing SMS techniques, and some functions of the SMS are improved. Accordingly, the EMS (Enhanced Messaging Service) can be considered as an intermediate step between the SMS (Short Messaging Service) and the MMS (Multimedia Messaging Service).

Methods of transmitting contents using the EMS or MMS include a method of inserting images in some parts of a message in the form of "emoticons" (emotion icons). However, this method is merely a slight variation from the related art and has a problem in that the displayed icons are not interesting to the recipient because the displayed images are static and small in size. Also, a method of sending and receiving moving images (simple animation) by attaching them to a text message exists, but such is also problematic in that the images are in the form of icons, their displayed movement range is restricted, and the user may not be satisfied with the movements being displayed.

BRIEF DESCRIPTION OF THE INVENTION

Therefore, an object of the present invention is to provide a method that allows a mobile terminal to send and receive contents audibly or visually, and particularly, a method that allows a reception terminal to play the contents according to an intention of a transmission terminal by setting information regarding the contents in data to be transmitted.

Another object of the present invention is to provide a mobile terminal and method for transmitting and receiving contents, which address the limitations and disadvantages associated with the related art.

To achieve these and other advantages and in accordance with the purposes of the present invention, as embodied and broadly described herein, there is provided according to one aspect a message service protocol in a transport layer of a message service protocol, comprising: an identifier field indicating use of contents; a size field indicating a display screen size ratio of the contents; and an information field indicating information of the contents.

To achieve these and other advantages and in accordance with the purposes of the present invention, as embodied and broadly described herein, there is provided according to another aspect a mobile terminal for sending/receiving contents, the terminal comprising: a transceiver for sending/receiving one or more contents; a display unit for displaying the one or more received contents; and, a controller for controlling the transceiver and the display unit, such that the received contents are displayed in an overlapping manner on a text message to be sent/received together with the contents.

To achieve these and other advantages and in accordance with the purposes of the present invention, as embodied and broadly described herein, there is provided according to another aspect a method for transmitting contents, the method comprising: receiving a message; receiving information regarding one or more contents; and, transmitting the message and the information together.

To achieve these and other advantages and in accordance with the purposes of the present invention, as embodied and broadly described herein, there is also provided according to another aspect a method for receiving contents, the method comprising: receiving data; checking whether information regarding one or more contents is set in data; and, playing back a message and the one or more contents according to the result of the checking.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings. Various components and procedures that would be known or understood to those skilled in the art will not be described in detail herein to prevent the features of the invention from being obscured.

Figure 1:
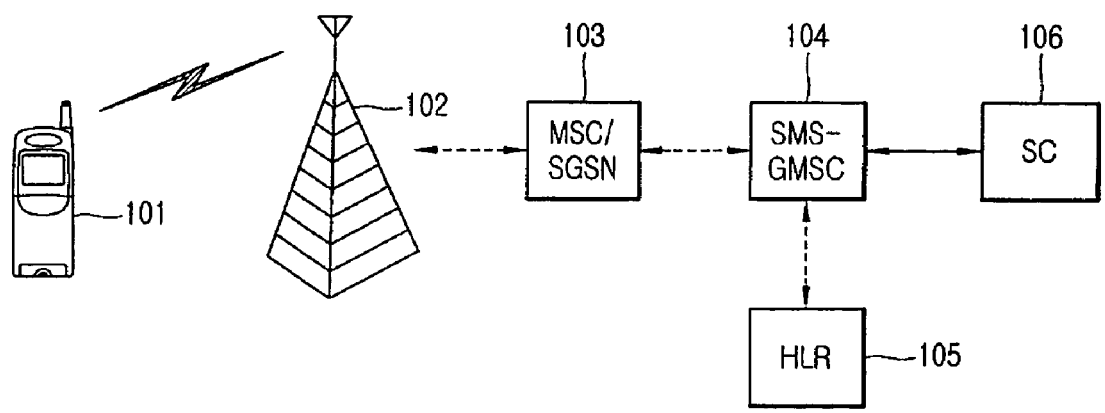
FIG. 1 is a configuration view that illustrates the configuration of a related art SMS system.
Figure 2:
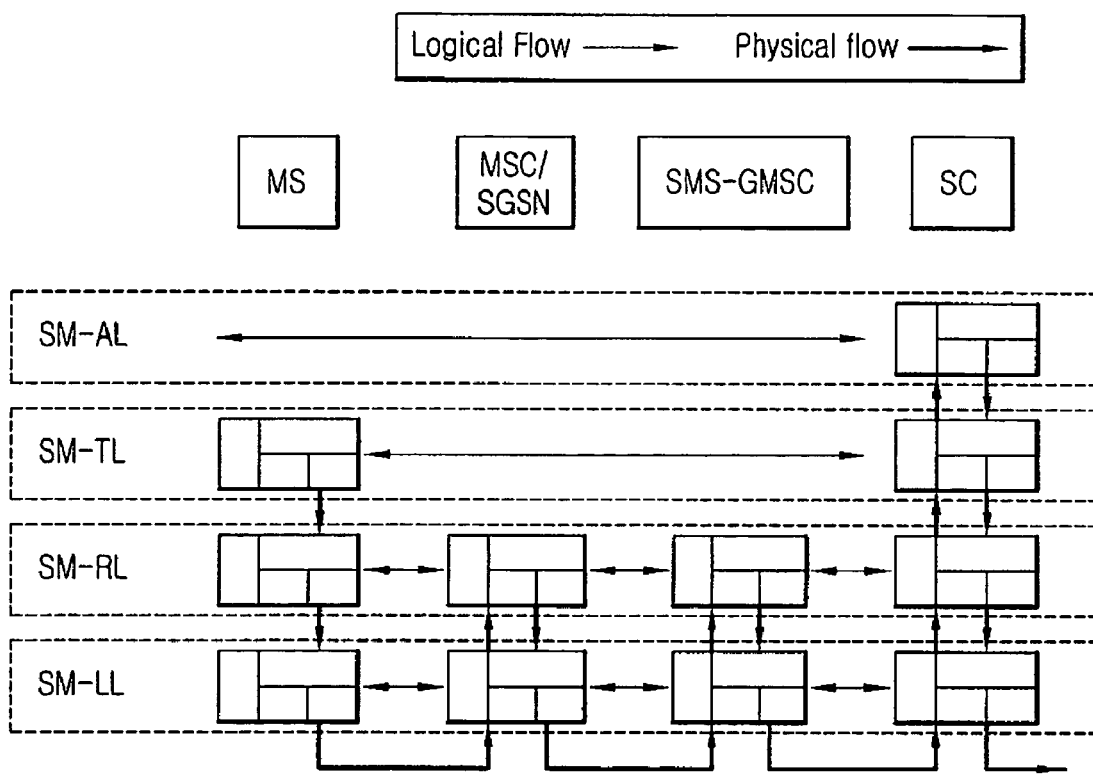
FIG. 2 is a configuration view that illustrates a protocol stack of the related art SMS.
Figure 3:
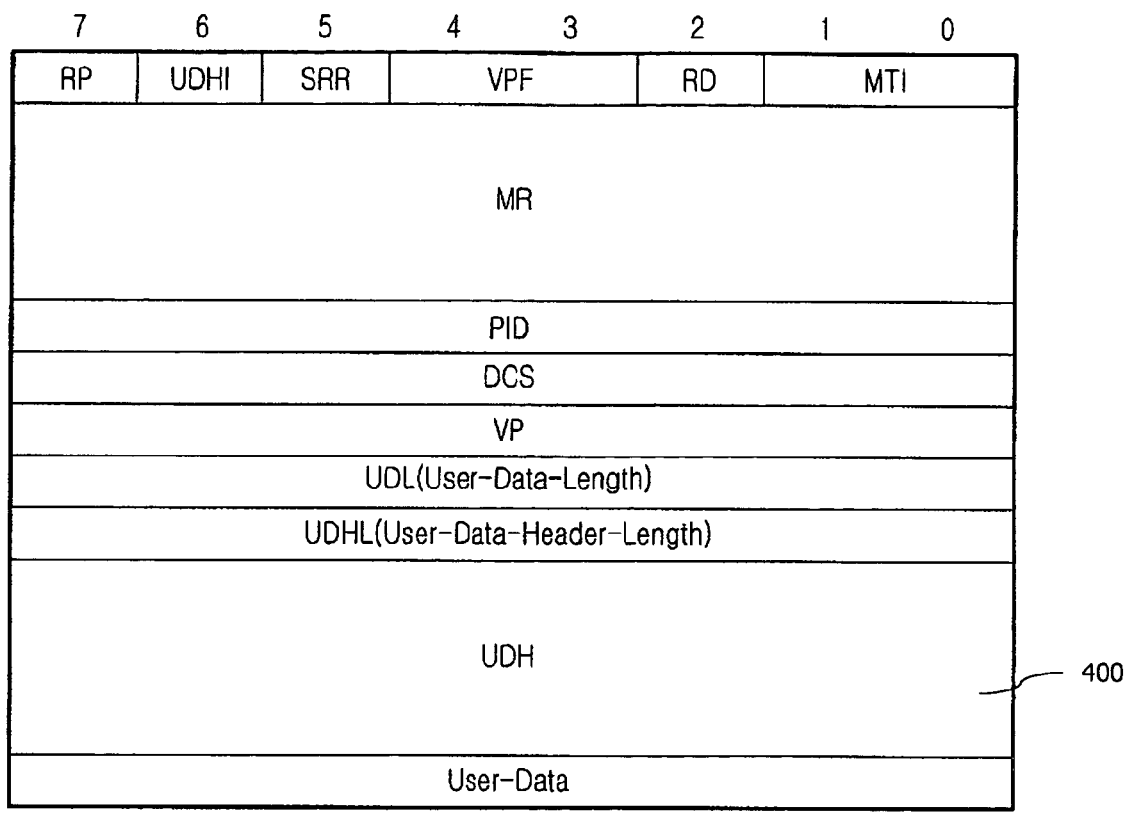
FIG. 3 is a schematic view that illustrates a transport layer of an SMS protocol according to an embodiment of the present invention.

FIG. 3 is a schematic view that illustrates a transport layer of an SMS protocol according to the present invention.

In FIG. 3, a transport layer with respect to a packet transmitted to a service center from a mobile terminal is illustrated. Here, the packet can have a length of 8 bits. First, an MTI (Message Type Indication) field indicates a type of a transmission data, an RD (Reject-Duplicates) field indicates whether a duplicated message is rejected, and a VPF (Validity Period Format) field indicates whether a VP field exists. Also, an SRR (Status Report Request) indicates whether a state report is requested, and a UDHI (User Data Head Indication) field indicates whether a user data header is included in a User-Data field. An RP (Reply-Path) field indicates whether a response path parameter is set. Then, an MR (Message Reference) indicates a kind of a message, and a PID (Protocol Identifier) indicates what protocol an upper layer uses. A DCS (Data Coding Scheme) clearly expresses a User-Data implementation type. A VP (Validity Period) indicates one of a relative format, an absolute format, and an enhanced format. A UDL (User Data Length) indicates a length of data inputted by a user, and a UDHL (User Data Header Length) indicates a header length with respect to data designated by the user. A UDH (User Data Header) 400 indicates a header designated by the user, and lastly, User-Data is a part where data inputted by the user is loaded.

In the present invention, information on contents is set to the UDH 400 of the packet for the purpose of sending and/or receiving the contents. Here, the phrase "contents" can refer to graphics with movement effects, such as so-called Flash™ animation, that can be reproduced (played back). A value representing that a user data header (UDH) is included can be set in the UDHI field of the packet, and a value representing a length of the user data header (UDH) can be set in the UDHL of the packet. Because the UDHI and UDHL are well known to those skilled in the art, a further description thereof will be omitted, and the following description will concentrate only upon setting information on contents in the UDH 400.

Figure 4:
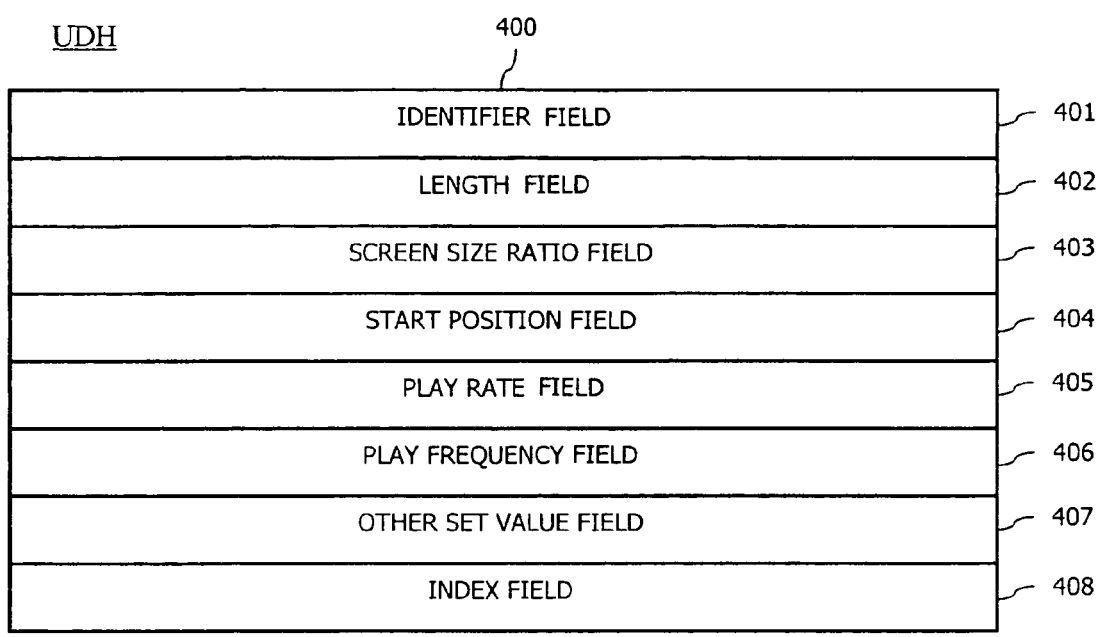
FIG. 4 is a schematic view that illustrates a part of an exemplary packet of a transmitted layer set according to an embodiment of the present invention.

FIG. 4 is a schematic view that illustrates a portion of an exemplary transport layer set according to one embodiment of the present invention.

Referring to FIG. 4, it can be seen that information on one or more contents can be set in the UDH 400 of FIG. 3 in accordance with the present invention. As shown, the UDH 400 includes a plurality of fields 401~408. An identifier field 401 according to the present invention indicates that information about one or more contents is set (or use of the contents), and a length field 402 of the information about the contents indicates the total length of the set information on the contents. A screen size ratio field 403 indicates a ratio of the screen size occupying a display unit of a recipient mobile terminal (reception side). A start position field 404 indicates a position where one or more contents are respectively played (reproduced) at the reception side, namely, a time when the contents within a message are started, and a play rate field 405 can designate a rate or speed at which the one or more contents are played. A play frequency field 406 can designate a frequency (e.g., number of times) at which the one or more contents are to be played/reproduced. Also, another set value field 407 can designate various set values (setting values) for playing (reproducing) the contents. An index field 408 can designate characteristic index number values of the contents. Also, although not shown in FIG. 4, contents may be directly added, and an contents addition field therefor may be further included in the UDH 400 (or in other field).

Here, the value that can be designated to the screen size ratio field 403 may be an indication/instruction that the contents be displayed on an entire screen as a default. Also, if the contents are pre-stored within the reception mobile terminal, a value that can be designated to the index field 408 may be an indication/instruction that the reception mobile terminal is to read the index number and display the stored contents. Using such an index field is advantageous in that a load on a network can be reduced by directly transmitting the contents. However, if the contents are contents added by the transmission side, a value that can be designated to the index field 408 may be data about a description of the contents. Here, the description on the contents may be information of contents inputted by a transmitter, or may be information inputted by a producer of the contents if the transmitter downloaded the contents from the Internet or other source. Particularly, when such information is information inputted by the content producer, the content producer can induce the receiver to pay for downloading of the contents through an Internet connection by allowing the user to preview the contents.

The contents may be letters, and in that case, the UDH 400 may further include a field for designating a font style, a font color, a font size, etc.

The aforementioned fields may be 1-bit in size, or be greater or smaller than 1-bit, respectively. Accordingly, all or some of the set values may be filled in the 1-bit field. Also, besides those fields, additional fields may exist. The additional fields may be fields reserved for functions to be used later. A mobile terminal that can implement such configuration will now be described.

Figure 5:
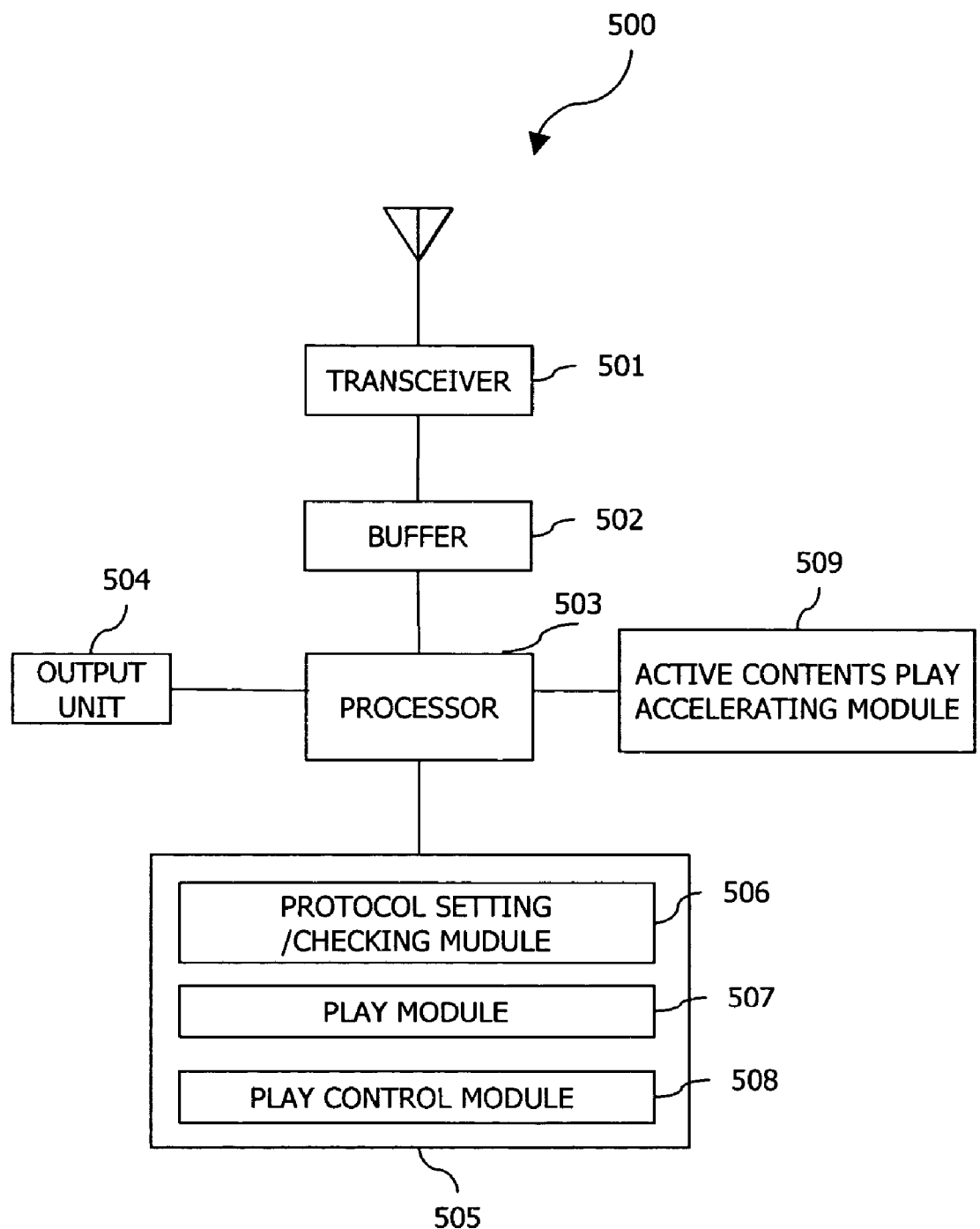
FIG. 5 is a configuration view that illustrates an exemplary mobile terminal that sends and receives contents according to one embodiment of the present invention.

FIG. 5 is a configuration view of an exemplary mobile terminal 500 for sending and/or receiving contents in accordance with one embodiment of the present invention.

As illustrated, the mobile terminal 500 can include a transceiver 501, a buffer 502, a processor 503, an output unit 504, a protocol setting/checking module 506, a play module 507 and a play control module 507. All components of the mobile terminal 500 are operatively coupled and configured.

The protocol setting/checking module 506 is for setting a parameter for contents in a packet of the transport layer or checking whether the parameter for the contents is set in the packet. The play control module 508 can control the play back of the contents according to a value set to a protocol or a setting of a receiver if any special setting of the user exists. Each module can be implemented as a chip according to one embodiment of the present invention. However, preferably, the modules may be stored in a first storage 505, and the first storage 505 may be a memory or a hard disc.

The mobile terminal 500 in accordance with an embodiment of the present invention may further include a contents play accelerating module 509. This module 509 is useful when the play back of the contents causes a very large load. Here, the play accelerating module 509 may be constructed by an ASIC (application specific integrated circuit), which may improve performance when compared to employing software for the module 509. Also, the play accelerating module 509 may be a 3-D graphics accelerating chip set provided in accordance with one embodiment.

A screen in which the aforementioned contents are being displayed on a display unit of the mobile terminal will now be described according to the present invention.

Figure 6:
FIG. 6 is a schematic view that illustrates an example of a user interface device in accordance with one embodiment of the present invention.

FIG. 6 is a schematic view that illustrates an exemplary user interface device in accordance with one embodiment of the present invention.

In FIG. 6, it can be seen that contents are played when a message is received. For example, as shown in FIG. 6, if the contents named "a person who is making a phone call" are inserted in a message, the contents are played first in a reception mobile terminal (mobile terminal at the receiving side). After the play back is completed, the message can be read. Although not shown in FIG. 6, as another example, when the contents named "a boy who is skiing" are inserted, the boy who is skiing appears on an entire screen of a reception mobile terminal and an action of skiing is shown on the screen. Also, in the opposite manner to the aforementioned one, a message may be displayed on the screen first and then the contents may be played later according to one embodiment of the present invention.

The contents may be played (reproduced) such that it overlaps the received message in accordance with the present invention. In such a case, the contents are overlapped and reproduced at a predetermined screen size ratio, and preferably, the ratio would cover the entire screen of the mobile terminal. The contents are played only for a predetermined time to allow the message to be read, and then are faded or displayed as small images (e.g., in the form of icons) on the screen. Also, when there are one or more contents, the one or more contents may be alternately displayed on the screen at a predetermined time interval, or they may be displayed altogether at a predetermined screen size ratio.

The contents may be letters, and in this case, one or more letters may be shown as an entire phrase or may be shown one by one. Particularly, if the letters are shown one by one on the screen of the display unit of the mobile terminal, they may be displayed for a pre-set time duration at a ratio that each letter occupies the entire screen, which is particularly useful if the user has poor eyesight.

Also, the contents may be 3-dimensional images or holograms. If so, the play accelerating module 509 of the mobile terminal in accordance with the aforementioned present invention may be a 3-dimensional image accelerating module or a hologram accelerating module.

Although the above description focuses on the sending and/or receiving of contents in a text message, the present invention is not limited to text messaging but may also be applied to other data types, such as audio data, still images, photos, videos (moving images) and the like, that can be sent and received via a mobile terminal (or other portable electronic device). Accordingly, it is clear that the present invention can also be applied to a multimedia messaging service (MMS).

So far, the mobile terminal and the user interface for sending/receiving contents have been described. Hereinafter, a method for sending/receiving such contents will be described.

Figure 7:
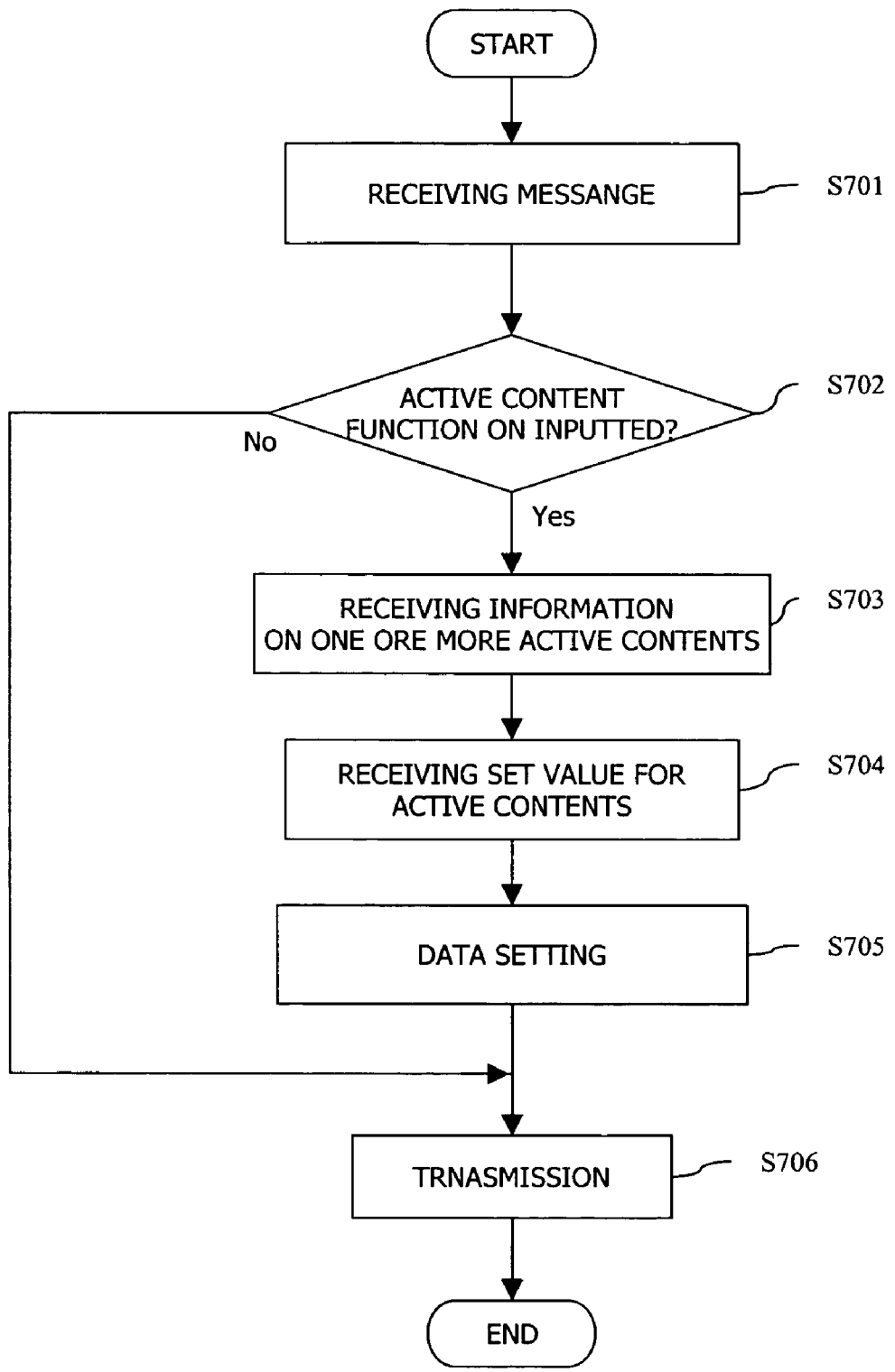
FIG. 7 is a flow chart that illustrates an exemplary method for sending and receiving contents in accordance with one embodiment of the present invention.

FIG. 7 is a flow chart that illustrates an exemplary method for sending contents according to one embodiment of the present invention. This method is implemented in the mobile terminal 500 at a transmitting side, but can be implemented in other suitable device.

As shown, a message is received, e.g., from a user at the transmitting side, (S701) and then a command of the user about whether to turn on a content function is received (S702). Here, the sequential order of performing steps S701 and S702 may be reversed.

After the reception of the command instructing to turn on the content function (e.g., from the user at the transmitting side), information about one or more contents is received (S703). Here, if the contents are pre-stored in both the transmission and reception mobile terminals, e.g., if a mobile terminal manufacturer produces its mobile terminals with contents included therein, index numbers of the contents may be inputted. In this manner, the heavy load on a network, which would otherwise occur due to direct transmissions and receptions of the contents can be reduced or minimized since the actual contents are not transmitted but are retrieved from the reception mobile terminal using an index number. However, if contents exist only within the transmission side terminal, such as contents downloaded from the Internet by the sender or images captured through a camera by the sender, the reception terminal receives data corresponding thereto respectively. Here, the image captured through the camera may be an image captured during the reception (S703) or may be an image existing in an existing phone memory (e.g. photo album). Also, the contents may be obtained by combining or editing contents stored in the mobile terminal. Also, the contents may be an animated image, which is preferably in gif (graphics interchange format). Preferably, the contents may be a moving image file or Flash™ file. The contents may be contents constituted by letters. As describe above, in this case, the contents may be those that are pre-stored in the mobile terminal or downloaded.

Then, setting values for the contents are received (S704). Here, the setting values may be a screen size ratio, a start position, a play rate, the number of times of play (frequency) and other setting values. Also, if the contents are formed of letters (text), a font style, a font color, a font size, a start position, and types of letters for play back may be inputted.

Then, the inputted information and setting values are set in association with data (message) to be sent (S705), and then the set contents and message are transmitted to a mobile terminal (or other device) at a receiving side (S706).

Figure 8:
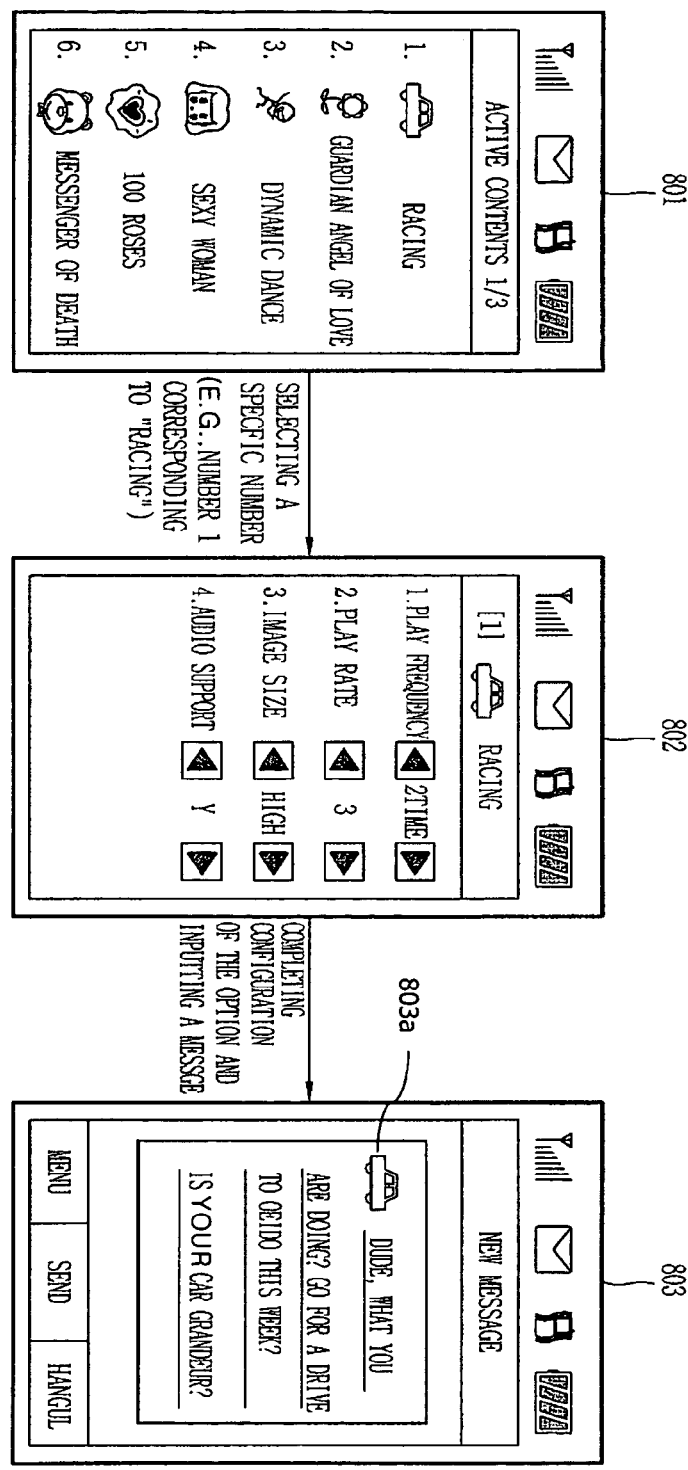
FIG. 8 is an exemplary view that illustrates an exemplary procedure of inputting contents in a transmission terminal according to an embodiment of the present invention.

FIG. 8 is an exemplary view that illustrates an exemplary procedure of inputting contents (S703 and S704) in the transmission mobile terminal described in FIG. 7 in more detail.

As shown, when a content function is activated (turned on) in the transmission mobile terminal, a list of contents that are stored in the transmission mobile terminal can be displayed on its screen (801). Here, the user may also input new contents as described above. Then, when the user selects a specific number (e.g., number 1, "RACING") from the list of the contents, a list of submenu items for selecting the setting values of the selected contents is displayed (802). For example, as shown, the number of times of play ("1. PLAY FREQUENCY"), a play back rate ("2. PLAY RATE"), an image size ("3. IMAGE SIZE"), and an audio support function ("4. AUDIO SUPPORT") are listed. However, the list of the setting values is not limited thereto, but may include more setting values other than those described above. Then the user manipulates the menu buttons/keys to set the desired setting values using the submenu items. Then, when the user completes the selection of the setting values of the submenu items (settings for the selected contents), an indication 803a indicating that the selected contents and their setting values have been inputted into the message is displayed (803). Here, the message may be inputted by the user before the content function is turned on or after the selection of the setting values of the contents is completed. Also, the indication 803a may be in the form of an icon or a name of the selected contents. Hereinafter, the case where the contents are letters will be described referring to FIG. 9.

Figure 9:
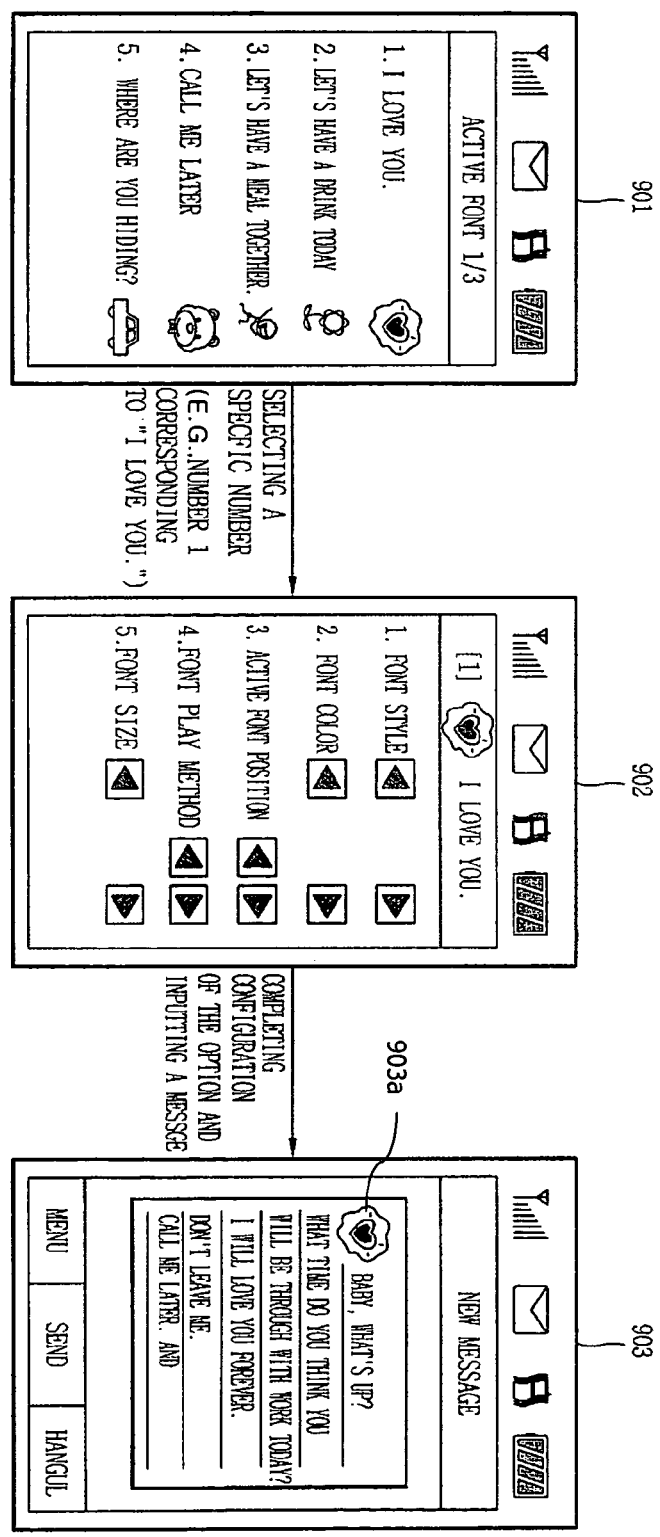
FIG. 9 is an exemplary view that illustrates an exemplary procedure of inputting words or sentences in the transmission terminal according to an embodiment of the present invention.

FIG. 9 is an exemplary view that illustrates a procedure of inputting letters or phrases in the transmission mobile terminal.

As shown, even when the contents are letters, the input method thereof is similar to the aforementioned method of inputting contents. First, when the content function (e.g., "letters") is turned on, letters or phrases pre-stored in the mobile terminal can be displayed on its screen in a list (901). Additionally, the user may input new letters or phrases as described above. Then, when the user selects one specific number (e.g., number 1, "I LOVE YOU") from the list of the letters or phrases, setting values for the corresponding letters or phrases are listed on the screen of the mobile terminal (902). For example, as shown, a font style, a font color, a position of a letter, a letter play method, and a font size are listed. However, the list of the setting values is not limited thereto but may include other setting values. Then, the user makes the selection of setting values. When the user completes the selection of the setting values for the selected contents, an indication 903a indicating that the corresponding letter(s) or phrase(s) (contents) is inserted in the message, is displayed on the screen of the mobile terminal (903). Here, the message may be inputted by the user before the content function is turned on or after the selection of the setting values of the contents is completed. Also, the indication 903a may be in the form of an icon or a name of the corresponding contents. Although not shown, any inputted contents (and message) can be previewed before the transmission.

The method of inputting and transmitting the contents has been described so far. Hereinafter, a method of receiving such contents will be described.

Figure 10:
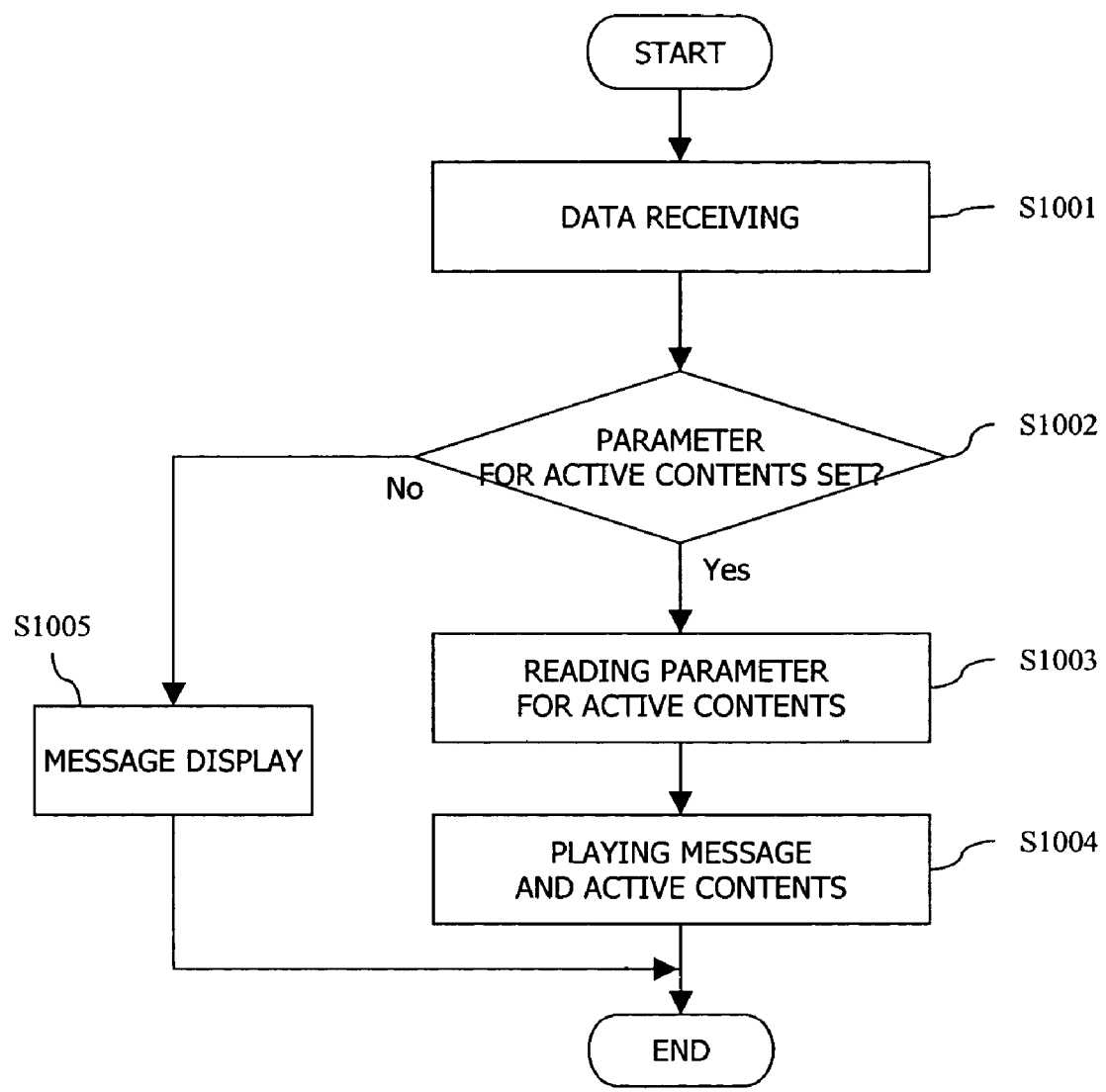
FIG. 10 is a flow chart that illustrates an exemplary method for receiving contents in accordance with one embodiment of the present invention.

FIG. 10 is a flow chart that illustrates an exemplary method for receiving the contents in accordance with one embodiment of the present invention.

As shown, when a message from the terminal at the transmitting side is received by a mobile terminal at a receiving side (S1001), the receiving mobile terminal check whether a parameter for the contents is set (S1002). Only as an example, the identifier field 401 of the UDH 400 of the received packet as shown in FIG. 4 may indicate whether or not the parameter(s)/settings for any contents are set. If the checked result shows "No" (e.g., there are no contents associated with the received message), only the received message is displayed. However, if the checked result is "Yes", the parameter(s) for the contents are read (S1003), and then, the contents and the received message are played or reproduced on the receiving mobile terminal (S1004). The contents may be played according to the received setting values of the contents (e.g., as provided in the fields of the UDH 400 of the corresponding packet), or under control of some other entity/setting.

Here at step S1004, the contents and the received message may be displayed together in an overlapping manner, such as showing the contents in a relatively "transparent" manner to allow the underlying message to be seen through the contents. Alternatively, the contents and the received message can be displayed on different portions of the display screen such that both can be viewed simultaneously. Additionally or alternatively, the contents may be displayed first, such that the recipient must view the contents before viewing the received message. Options can be set such that the received message is prevented from being displayed until the contents have been viewed/played. It can be foreseen that commercials and/or advertisements may be displayed on the mobile terminal screen as the contents. Here, the advertiser may pay a fee to the service provider in compensation for sending advertisements (in the form of contents) attached to a text message (or other types of messages) sent to mobile phone subscribers (consumers) via a messaging service, like the Multimedia Messaging Service (MMS).

Although not shown, the reception mobile terminal may control the play settings of the contents. Namely, the reception mobile terminal can temporarily stop or stop the contents being played when necessary or may turn on or turn off the play back. Also, the reception mobile terminal can control an audio output volume of the contents being played back or a size ratio of the graphics being displayed on the screen of the reception mobile terminal on which the contents are being played. Although not shown, the reception mobile terminal may designate the contents as a screen background (e.g., wallpaper).

The methods that have been described thus far can be implemented by software, hardware or a combination of both. For example, the method(s) can be stored in a storage medium (e.g., an internal memory of a mobile terminal, a Flash™ memory, a hard disc, etc.) and can be implemented as codes or commands in one or more software programs that can be executed by one or more processors (e.g., an internal microprocessor, graphics processor, etc. of the mobile terminal).

The present invention provides according to an embodiment a wireless communications device (or mobile terminal) supporting a messaging service, the device comprising: a transceiver to transmit and receive text messages with graphics (contents) including movement effects or others via the messaging service; a display to allow previewing of the text message and graphics before sending, and to allow displaying of the received text message and graphics after receiving; and a processor cooperating with the transceiver and the display to process the text message and graphics by performing the steps of, in transmission mode, processing the text message by including thereto information regarding the graphics such that the graphics should be viewed by a recipient before the text message can be fully viewed, and transmitting the text message together with the graphics to the recipient, and while in reception mode, receiving the text message together with the graphics from a sender, and displaying the text message and the graphics such that the graphics should be viewed before the text message can be fully viewed.

The graphics can be first displayed on one screen view, and the text message can be later displayed on a second screen view. The graphics and the text message can be displayed on the same screen view, with the graphics overlapping the text message to substantially cover portions thereof. The graphics can be displayed during a limited time period. The graphics can be images that have animation effects. The graphics can be text that has animation effects. The graphics that should be viewed before the text message can relate to an advertisement for a product or a service.

The present invention also provides according to an embodiment a method of processing text messages together with graphics (contents) for a wireless communications device (or mobile terminal) supporting a messaging service, the method comprising: transmitting and receiving text messages and graphics including movement effects or others via the messaging service; and previewing the text message and graphics before sending, and displaying the received text message and graphics after receiving, whereby, in transmission mode, processing the text message by including thereto information regarding the graphics such that the graphics must be viewed by a recipient before the text message can be fully viewed, and transmitting the text message together with the graphics to the recipient, and while in reception mode, receiving the text message together with the graphics from a sender, and displaying the text message and the graphics such that the graphics must be viewed before the text message can be fully viewed.

The graphics that must be viewed before the text message can relate to an advertisement for a product or a service. An advertiser of the advertisement may have provided payment to a provider of the messaging service as a compensation for providing the graphics of the advertisement to the recipient for mandatory viewing before the text message can be fully viewed.

As so far described, according to the present invention, contents with a large size can be transmitted together with a message in sending and/or transmitting data, for example, a message. Accordingly, the simplicity issue of the related art contents can be overcome, and demands of users can be satisfied. Further information regarding the contents can be provided in the UDH so as to control the play back setting of the contents at a receiving side.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile terminal for transmitting contents, the terminal comprising:
    a transceiver configured to receive a user input and a text message to be transmitted;
    a display unit configured to display the text message to be transmitted; and
    a controller configured to select contents from a contents list according to the user input, and set information for controlling a remote display of the selected contents so that a device receiving the text message plays back the contents in an overlapped manner over the text message at a preset size ratio,
    wherein the controller is further configured to display, on the unit of the mobile terminal, an indication display notifying that the selected contents have been inputted into the text message when the information for controlling the remote display is completely set, the indication display including an icon or a name of the selected contents,
    wherein the transceiver is configured to transmit the set information in the text message together with the selected contents, and
    wherein the information is inserted into a header of the text message and includes:
        an identifier field indicating a contents use,
        a length field indicating the total length of the set information,
        a screen size field indicating a ratio of the screen size of the contents, and
        an information field indicating a value related to a display of the contents.

2. The mobile terminal of claim 1, wherein the transceiver is configured to transmit the set information in the text message together with the selected contents by using a message protocol which comprises:
    an identifier field indicating a contents use;
    a size field indicating a display screen size ratio of the contents; and
    an information field indicating information of the contents.

3. The mobile terminal of claim 2, wherein the information field indicates an index number of the contents.

4. The mobile terminal of claim 2, wherein the information field comprises a position field indicating a play back position of the contents.

5. The mobile terminal of claim 2, wherein the information field comprises a rate field indicating a play back rate of the contents.

6. The mobile terminal of claim 2, wherein the information field comprises a frequency field indicating the number of times that the contents are to be played back.

7. The mobile terminal of claim 1, wherein the controller is configured to play back the contents in a form of an icon after the preset period of time.

8. The mobile terminal of claim 1, wherein the controller is configured to play back the contents in a form of an icon at a preset time interval, respectively.

9. A method for transmitting contents in a mobile terminal, the method comprising:
    inputting a text message;
    displaying the inputted text message;
    selecting contents to be transmitted from a contents list;
    setting information for controlling a remote display of the selected contents so that a device receiving the text message plays back the contents in an overlapped manner over the text message for a preset period time; and transmitting the set information in the text message together with the selected contents,
wherein the setting the information for controlling the display of the selected contents comprises:
 detecting whether a contents function is activated;
 displaying the contents list if the contents function is activated;
 displaying a list of set values for the selected contents if a specific contents is selected in the contents list;
 setting the set values for the selected contents according to a user input in the list of set values; and
 setting an indication display that the selected contents have been inputted in the text message when the set values are set, the indication display including an icon or a name of the selected contents displayed on a display unit of the mobile terminal, and
wherein the information is inserted in a header of the text message and includes:
 an identifier field indicating a contents use,
 a length field indicating the total length of the set information,
 a screen size field indicating a ratio of the screen size of the contents, and
an information field indicating a value related to a display of the contents.

10. The method of claim 9, further comprising:
downloading the contents from a server.

11. The method of claim 9, wherein the contents are static images, moving images, or images consisting of letters.

12. The method of claim 9, wherein the information field comprises a position field indicating a play back position of the contents.

13. The method of claim 9, wherein the information field comprises a rate field indicating a play back rate of the contents.

14. The method of claim 9, wherein the information field comprises a frequency field indicating a number of times that the contents are to be played back.

15. The method of claim 9, wherein the information comprises at least one of a contents font style, a contents font color, a contents font play back method, and contents sound volume information.

16. The method of claim 9, further comprising:
receiving the information regarding the contents, including:
 receiving contents consisting of letters pre-stored in a mobile terminal; and
 receiving setting values for play back of the received contents.

* * * * *